United States Patent [19]

Komarneni et al.

[11] Patent Number: 5,052,188
[45] Date of Patent: Oct. 1, 1991

[54] DESICCANT MATERIALS FOR USE IN GAS FIRED COOLING AND DEHUMIDIFICATION EQUIPMENT

[75] Inventors: Sridhar Komarneni; Prakash B. Malla, both of State College, Pa.; Shoji Yamanaka, Hiroshima, Japan

[73] Assignee: Gas Research Institute, Chicago, Ill.

[21] Appl. No.: 602,665

[22] Filed: Oct. 24, 1990

[51] Int. Cl.$^5$ .................. F25D 17/08; B01J 29/06
[52] U.S. Cl. ................................. 62/94; 502/60
[58] Field of Search ............. 62/271, 94; 252/194; 502/60

[56] References Cited

U.S. PATENT DOCUMENTS

| Re. 28,341 | 2/1975 | Wadlinger et al. | 502/60 X |
|---|---|---|---|
| 2,765,046 | 10/1956 | Rondholz | 62/271 |
| 3,301,788 | 1/1967 | Cummings et al. | 252/194 |
| 3,391,511 | 7/1968 | Morton | 252/194 X |
| 4,061,724 | 12/1977 | Grose et al. | 502/60 X |
| 4,526,877 | 7/1985 | Acharya et al. | 502/60 |
| 4,748,082 | 5/1988 | Dorr et al. | 502/60 X |

*Primary Examiner*—William E. Tapolcai
*Attorney, Agent, or Firm*—Perman & Green

[57] ABSTRACT

The present invention provides for a process of reducing the polarity on the internal surfaces of various zeolites having a $SiO_2$ to $Al_2O_3$ ratio of at least about 3 and an average pore diameter size within the range of from about 4 to about 10 angstroms. The modified zeolites in accordance with the present invention are prepared by heating the starting zeolite in an aqueous medium also containing an acid or a source of ammonium ions to at least partially dealuminize the zeolite and thereby increase the ratio of silicon to aluminum present in the tetrahedral structure. At the same time, the process provides for hydrogen ion exchange with respect to those zeolites which contain significant amounts of metallic cation in the structure thereby replacing the bulky metallic cations with less bulky hydrogen ions and thereby increasing the water adsorptive capacity of the zeolite. Achievement of the appropriate equilibrium between reduced surface polarity on the one hand and increased sorptive capacity of the zeolite on the other hand gives rise to zeolite materials having an isotherm with a separation factor within the range of from about 0.07 to about 0.1 which renders the modified zeolite an ideal desiccant for gas fired air conditioning and dehumidification equipment.

13 Claims, 12 Drawing Sheets

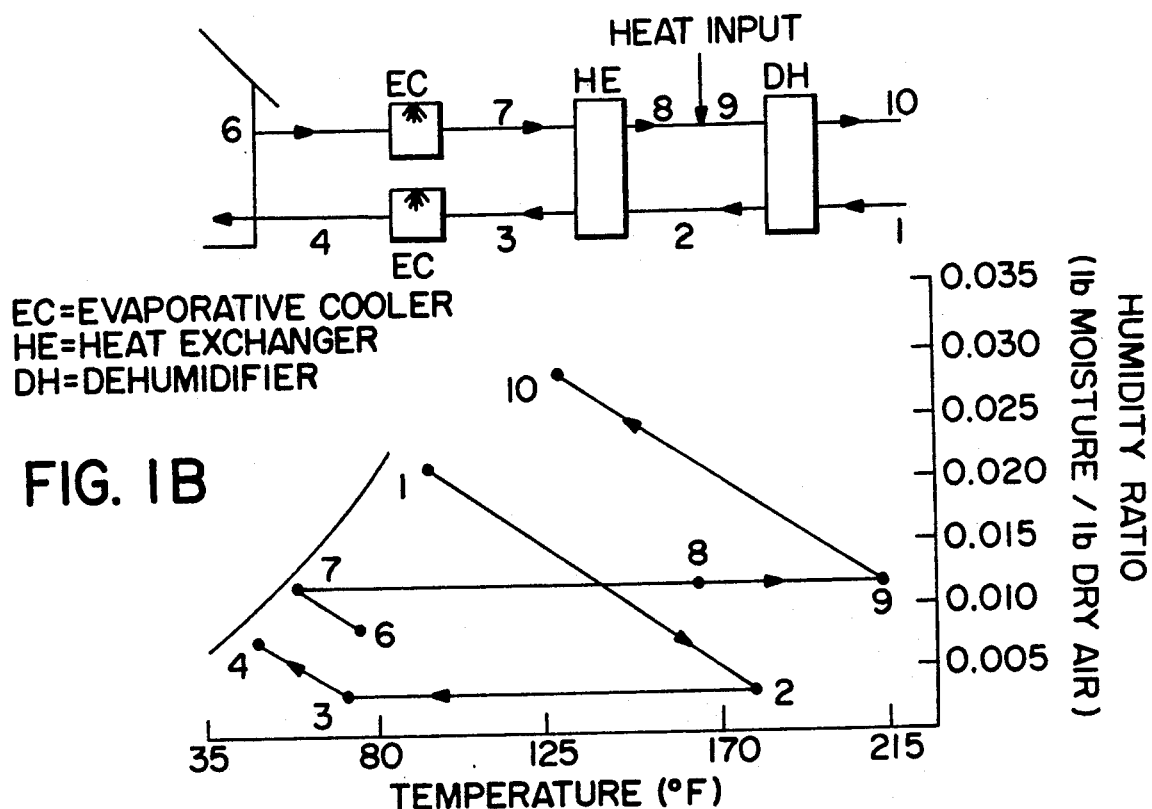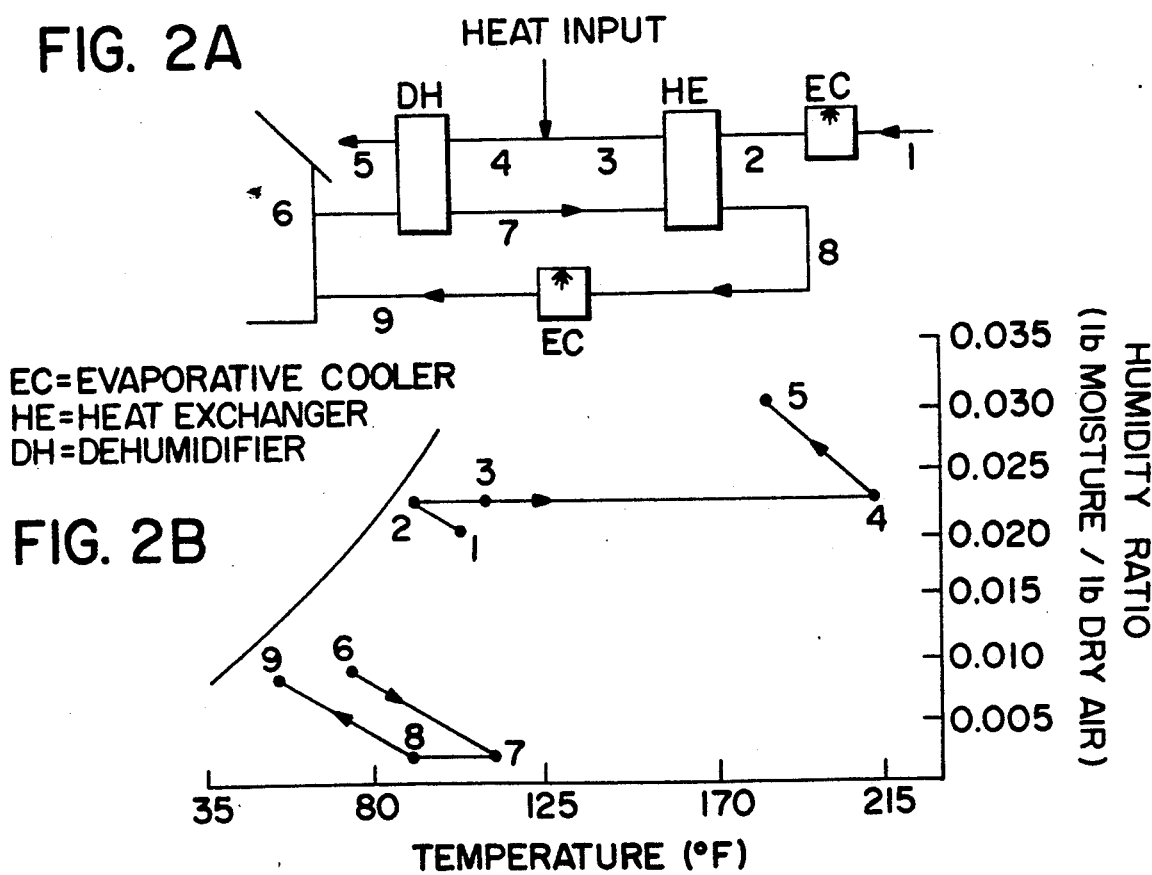

□ DESIRED SHAPE  △ MOLECULAR SEIVE (4A)  ○ SILICA GEL
◇ DOPED ACTIVATED CARBON  + ACTIVATED ALUMINA (H-152)

○ WATER ADSORPTION
● WATER DESORPTION

○ WATER ADSORPTION   ● WATER DESORPTION

DESICCANT MATERIALS FOR USE IN GAS FIRED COOLING AND DEHUMIDIFICATION EQUIPMENT

BACKGROUND OF THE INVENTION

The present invention relates to desiccants based on modified zeolites having an isotherm separation factor within the range of from about 0.07 to about 0.1 and their use in gas-fired cooling and dehumidification equipment.

Desiccant cooling systems employ an open cycle to process water vapor between a conditioned space and the environment. The use of thermal energy creates a chemical potential that can be used to produce a cooling effect. If the air can be made dry enough, an evaporative cooler will produce air that is as cold as a conventional electric air conditioner. The overall performance of these systems relies on the quality of the thermal energy input (availability) and the environment as both a cold sink and as a source of chemical potential (unsaturated air). Most solid desiccant cooling cycles consist of a desiccant dehumidifier, a sensible heat exchanger and two evaporative coolers. There are two important modes of operation: 1) The ventilation mode where outdoor air is processed to produce low enthalpy air for the cooled space, and 2) The recirculation mode where air from the cooled space is processed to maintain low enthalpy air conditions in the space.

A schematic of the ventilation mode (a) and a psychrometric representation of the cycle (b) are shown in FIG. 1. Ambient air at (1) is adiabatically dehumidified by the desiccant (DH). The hot, dry air at (2) is cooled by the sensible heat exchanger (HE) to create dry cool air at (3). This air is then adiabatically humidified by the evaporative cooler (EC) to produce cold, nearly saturated air at (4) that enters the building. Simultaneously, an equal amount of building air at (6) is adiabatically humidified to (7). This produces the cold sink for the dry air (3). The air is then heated by the same heat exchanger to (8). This is an attempt to recuperate as much of the heat of sorption as possible from the dehumidification process. The enthalpy of the air must now be increased to (9) by a thermal energy input such as natural gas heating. This air is then passed through the desiccant in order to regenerate it. The warm, humid air that exits the desiccant at (10) is then exhausted to the atmosphere.

A schematic of the recirculation mode (a) and a psychrometric representation of the cycle (b) are shown in FIG. 2. This time ambient air at (1) is adiabatically humidified to (2). This air now becomes the cold sink for the cycle. It is heated by the sensible heat exchanger to (3) and then further heated to (4) by an external thermal input such as natural gas heating. This air is then used to regenerate the desiccant material. The warm, humid air that exits the desiccant at (5) is returned to the environment. Simultaneously, room air at (6) is adiabatically dehumidified by the desiccant to produce warm, dry air at (7). This air is then cooled with the humidified and cooled ambient air to create cool, dry air at (8). The air is then adiabatically humidified to produce the cold, near saturated air at (9) which is returned to the building.

Both of the operational modes previously described operate on a continuous basis. That is, both the dehumidification and the regeneration processes occur at different parts of the cycle simultaneously. In order to accomplish this, the desiccant is deployed into a rotating wheel or drum that continuously cycles the desiccant between the dehumidification and regeneration air streams. The heat exchanger may be of a rotating or static design and the evaporative coolers must be distinctly separate units.

Three important interrelated performance parameters that determine the viability of desiccant cooling systems include:

1. Thermal coefficient of performance (COP).
   The thermal COP is the nondimensional ratio of the amount of cooling output that is produced by a given amount of external energy input. For comparative purposes, COP is often quoted at Air Conditioning and Refrigeration Institute (ARI) rating conditions of 95° F. dry bulb and 75° F. wet bulb outdoor temperatures and 80° F. dry bulb and 67° wet bulb indoor temperatures.
2. Parasitic electric energy efficiency ratio (EER).
   The EER is a measure of the amount of cooling, in thermal units (BTUs), that is produced by a given amount of parasitic electric energy input for fans, pumps, etc. in electrical units (Watts).
3. Specific cooling capacity (SCC).
   This factor is defined as tons of cooling capacity per 1000 cubic feet per minute of supply air.

A combination of higher COP values and increased SCC values yields desiccant cooling systems that are more efficient and cost effective than state of the art devices. It has been determined that one of the primary factors affecting these values is the identity of the particular desiccant material employed in the system in terms of its psychrometric performance in the dehumidifier section of the system. For both the dehumidification and regeneration processes, there are two fundamental wavefronts that occur. The first and fastest wave is primarily a thermal front that is most affected by the total amount of thermal heat capacity associated with the dehumidifier. The second and slowest wave is the main concentration wavefront with strong associated thermal effects. Without getting into the details of the physical chemistry involved, it has been postulated that the primary function of an ideal desiccant material in an open cycle desiccant cooling system should be to produce the sharpest possible concentration wavefronts for both the dehumidification and regeneration processes.

Properties of ideal desiccants effecting these characteristics have been determined to include low heat of adsorption, high water adsorption capacity, high diffusivity of water, high chemical and physical stability towards heat, and most importantly, the shape of the desiccant isotherm.

It has been determined that the ideal shape of the desiccant isotherm for use in gas fired cooling-/dehumidifier systems has a separation factor ranging from 0.07 to about 0.1 in accordance with the isotherm equation:

$$X = \frac{P}{R + P - RP}$$

wherein x is the normalized loading fraction of water, P is the relative vapor pressure of water and R is the separation factor.

Several adsorption isotherms with different identified separation factors are shown in FIG. 3. Extreme Brunauer Type I isotherm is shown by the curve designated 0.01, whereas linear and less than linear isotherms are shown by the line designated 1.0 and the curve designated 10.0. The ideal isotherm shape is depicted as the area between the curves designated 0.07 and 0.1.

Most of the commercially available desiccant materials have not been developed for the specific purpose of providing space cooling. In most present day applications, the necessity of achieving efficient regeneration as well as deep drying of the air has not been a consideration. The requirement of attaining the very sharp adsorption wavefronts associated with molecular sieves along with the more efficient regeneration characteristics of the desiccant are what makes this application unique commercially. It is not surprising therefore, that none of the commercially available desiccants match the properties needed. The isotherms of various commercial and laboratory-developed desiccants are shown in FIG. 4. The trend is to see linear or nearly linear (Brunauer Type II) isotherms or extreme (Brunauer Type I) isotherms, as compared with the nearly ideal isotherm shape (moderate type I or Langmuir) designated as the "desired shape" for the purposes of this invention. This isotherm has a separation factor (R) of about 0.1.

Zeolites, both natural and synthetic, have been demonstrated in the past to have sorbent capabilities for water. Zeolites are crystalline, hydrated aluminosilicates with three-dimensional framework structure. The aluminosilicate framework is built up such that they possess cavities and channels of various dimensions depending upon the type of zeolite. In the structure of zeolite, $Al^{3+}$ substitutes for $Si^{4+}$, and hence develops a net negative charge which is balanced by different alkali metal and alkaline earth cations. It has been established that the charge-balancing cations of one type can be replaced by another (ion exchange), in most cases, without changing the crystalline structure. Because of small pore size, and presence of negative charge due to $Al^{3+}$ substitution and alkali cations in the cavities, zeolites have a large affinity towards water molecules. The net effect is to exhibit an extreme Type I (Langmuir) adsorption isotherm with water as illustrated in FIGS. 3 and 4. For a constant polarity on the surface of porous solids, the effect of reduced pore size is to give an enhanced adsorption at low relative pressure (extreme Langmuir type isotherm) due to an overlapping of potential fields from the neighboring walls of the pore. On the other hand, for a constant pore sized material, increased polarity on the pore surfaces gives an enhanced adsorption of water at low relative pressures and vice versa. For zeolites, ion exchange with various alkali cations effectively reduces the volume of readsorption in accordance with the size of the ions, but not the affinity between zeolite and water molecules provided the structure is not distorted by ion exchange. The effect is again to exhibit an extreme Type I isotherm as illustrated in FIG. 3.

It is known in the prior art that Zeolite materials may be dealuminized to increase the ratio of silica to aluminum and may also be subjected to ion exchange reactions to replace the charge-balancing metal ions with protons, i.e., hydrogen ions.

For example, U.S. Pat No. 4,740,292 discloses a dealuminization process comprising reacting a faujasite type zeolite or zeolite beta with a strong mineral acid or organic acid at temperatures up to boiling to extract aluminum. The reference also indicates that the process also at least partially replaces metal ions present in the crystalline structure with protons. The purpose of the treatment is to render mixtures of the zeolites more effective as catalytic cracking catalysts for hydrocarbon feedstocks.

U.S. Pat. No. 4,701,431 teaches a process for dealuminization of zeolite, such as zeolite Y, by treatment with ethylenediaminetetracetic acid or a derivative thereof to dealuminize the zeolite, followed by an ion exchange reaction wherein the zeolite cations are at least partially replaced with rare earth metal cations. Once again the treatment is said to render those materials suitable as catalysts for various chemical processes or as sorbents.

Similar processes are disclosed in U.S. Pat. Nos. 3,551,353 and 4,477,336.

U.S. Pat. No. 3,140,251 discloses a process for enhancing the catalytic activity of aluminosilicates comprising reacting the aluminosilicate with an ammonium compound as a source of ammonium ions, followed by heat treatment of the resulting complex to decompose the ammonium complex to provide the hydrogen ion form of the zeolite.

While these and other prior art disclosures generally recognize that the properties of zeolite materials may be tailored by altering the chemical composition to render them more effective in given catalytic or molecular sieve applications, none of these disclosures has an objective of altering zeolite materials to render them more suitable for use as desiccant materials in gas fired cooling and air conditioning applications or the achievement of ideal desiccant materials for such applications having an isotherm separation factor within the range of from about 0.07 to about 0.1.

Accordingly, it is an object of this invention to provide zeolite materials which have been chemically modified to achieve an isotherm with a separation factor range of from about 0.07 to about 0.1.

Another object of this invention is to provide modified zeolite materials which are ideally suited for use as desiccants in gas fired open space air-conditioning and dehumidification systems.

SUMMARY OF THE INVENTION

The present invention provides for a process of reducing the polarity on the internal surfaces of various zeolites having a $SiO_2$ to $Al_2O_3$ ratio of at least about 3 and an average pore diameter size within the range of from about 4 to about 10 angstroms. The modified zeolites in accordance with the present invention are prepared by heating the starting zeolite in an aqueous medium also containing an acid or a source of ammonium ions to at least partially dealuminize the zeolite and thereby increase the ratio of silicon to aluminum present in the tetrahedral structure. At the same time, the process provides for hydrogen ion exchange with respect to those zeolites which contain significant amounts of metallic cation in the structure thereby replacing the bulky metallic cations with less bulky hydrogen ions and thereby increasing the water adsorptive capacity of the zeolite. Achievement of the appropriate equilibrium between reduced surface polarity on the one hand and increased sorptive capacity of the zeolite on the other hand gives rise to zeolite materials having an isotherm with a separation factor within the range of from about 0.07 to about 0.1 and a heat of adsorption within the range of from about 11 to about 13 K cal/mole which renders the modified zeolite an ideal desiccant for gas fired air conditioning and dehumidification equipment.

BRIEF DESCRIPTION OF THE DRAWINGS

FIG. 1 is a schematic illustration of a ventilation mode of a desiccant cooling system (a) and a psychrometric representation of the cooling cycle (b).

FIG. 2 is a schematic illustration of a recirculation mode of a desiccant cooling system (a) and a psychrometric representation of the cooling cycle (b).

DETAILED DESCRIPTION OF THE INVENTION

Figure 3:
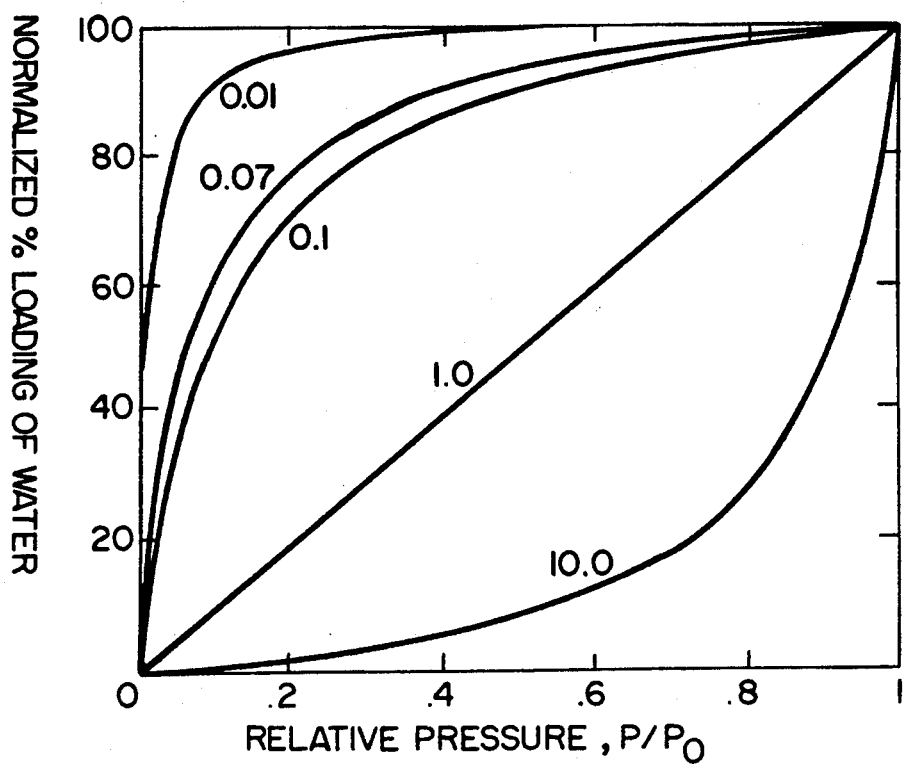
FIG. 3 is a plot showing extreme, ideal and linear isotherms for desiccant materials.
Figure 4:
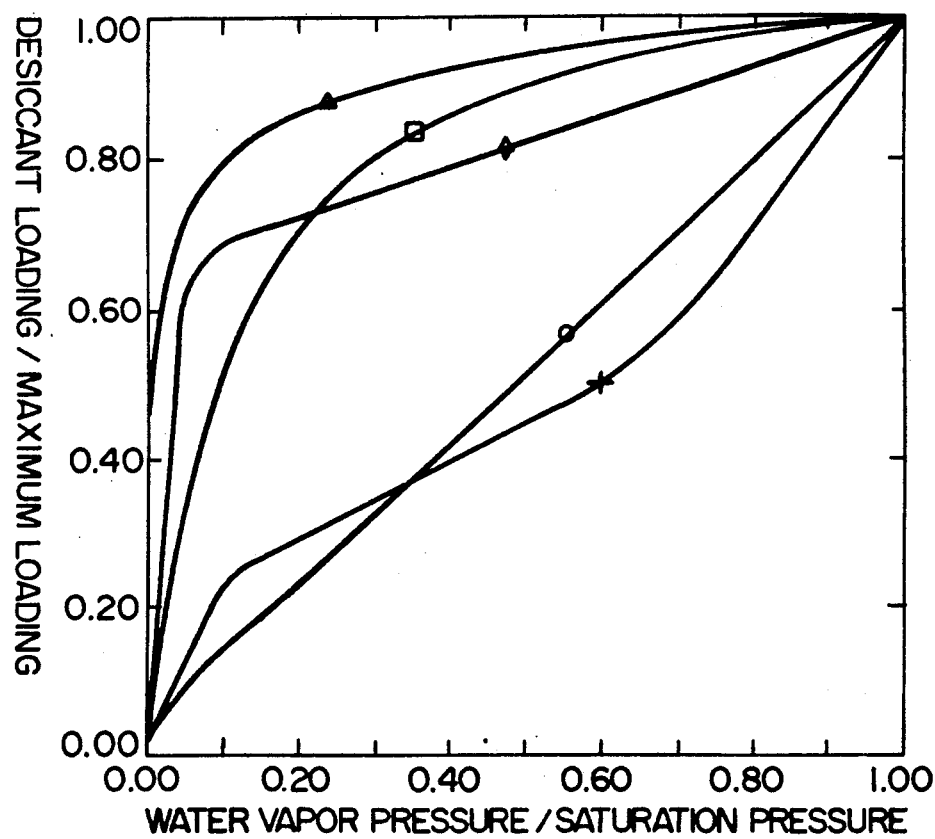
FIG. 4 is a plot of adsorption isotherms for various identified desiccant materials.

As indicated above, zeolite materials which may be modified in accordance with the process disclosed herein to produce ideal desiccants are those materials having an initial molar ratio of silica to alumina of at least about 3 and a pore diameter of from about 4 to about 10 angstroms, more preferably from about 5 to about 8 angstroms. These are materials which in their "as synthesized" or "as purchased" form yield an extreme type I isotherm when the isothermal properties are evaluated, as illustrated in FIG. 3, but which may be chemically and structurally tailored in accordance with the processes hereinafter described to provide the ideal isotherm having an isothermal separation factor within the range of from about 0.07 to about 0.1, as also illustrated in FIG. 3.

The aluminosilicates treated in accordance with the invention include a wide variety of aluminosilicates, both natural and synthetic, which have an amorphous or crystalline structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form the aluminosilicates may be represented by the formula:

$$\frac{M_2}{n} : Al_2O_3 : wSiO_2 : yH_2O$$

wherein M is a cation which balances the electrovalence of the tetrahedra, n represents the valence of the cation, w is the moles of $SiO_2$, and y the moles of $H_2O$. The cation may be any or more of a number of metal ions depending on whether the aluminosilicate is synthesized or occurs naturally. Typical cations include sodium, lithium, potassium, silver, magnesium, calcium, zinc, barium, iron, manganese, and other cations as known in the art.

The cation may also include hydrogen ions, or ammonium ions which may be subsequently thermally decomposed to form the hydrogen ion form of the aluminosilicate. The cation may also include mixtures of two or more of the ions recited above. The degree of hydration of the aluminosilicate may be such that y in the above formula ranges from 0 to about 30. Hydrated aluminosilicates wherein y ranges from about 20 to about 30 are more preferred.

The most preferred aluminosilicate starting materials are crystalline materials having a silica to alumina ratio of at least about 4, and more preferably from about 4 to about 20. The higher the initial ratio of silica to alumina within this range, the more heat stable the zeolite and the less rigorous will be the dealuminization treatment required to achieve the reduction in polarity needed to approach the ideal isotherm properties.

Examples of suitable natural and synthetic alumino silicates which may be employed as the starting material for the purposes of this invention include synthetic zeolites designated as Zeolites Y, 13Y, hydrated Na-Y, 100 zeolon Na, 100 zeolon H, and naturally occurring aluminosilicates such as erionite, mordenite and clinoptilolite.

Examples of particularly preferred zeolite starting materials are listed in Table 1 below.

TABLE 1

| Zeolites | Sources | Charge Balancing Cations | $SiO_2/Al_2O_3$ Ratio | Pore-size* (Angstroms) (Approx.) |
| --- | --- | --- | --- | --- |
| Y | PQ Corporation/ Union Carbide | $Na^+$, $H^+$, $NH_4^+$ | 3.0-6.0 | 8 |
| Zeolon Na | PQ Corporation/ Norton | $Na^+$ | 11.2 | 7 |
| Zeolon H | PQ Corporation/ Norton | $H^+$ | 11.2 | 8 |
| Erionite | Naturally Occurring (Minerals Research) | $Ca^{2+}$, $Mg^{2+}$, $Na^+$, $K^+$ | 6-8 | 5 |
| Mordenite | Naturally Occurring (Minerals Research) | $Na^+$, $Ca^{2+}$, $K^+$ | 8.3-10 | 7 |
| Clinoptilolite | Naturally Occurring (Minerals Research) | $Na^+$, $K^+$, $Ca^{2+}$, $Mg^{2+}$ | 8.5-10.5 | 5 |

*Pore-size depends on cation saturation

Dealuminization and hydrogen ion exchange may be accomplished by dispersing particles of the starting aluminosilicate material in an aqueous medium containing an acid or a compound providing a source of ammonium ions, and heating this mixture at a temperature ranging from about 150° to 220° F. for a period of time sufficient to exchange as much of the original metal cation as possible with protons or ammonium ions. Where the ion exchange medium is a protonic acid, the treatment simultaneously leaches aluminum from the polymorphic structure thereby reducing the polarity of the aluminosilicate. Where the ion exchange medium is a source of ammonium ions, the treatment initially replaces the original cation with ammonium ions. Subsequent heating of the ammonium exchanged material at temperatures within the range of 400° to 800° C. and preferably in a high moisture environment (steam) decomposes at least a portion of the ammonium form to the hydrogen form. The proton in turn attacks the aluminum present in the structure, and leaches it out. The steaming process also tends to solubilize a portion of the $SiO_2$ to the amorphous form allowing it to migrate and occupy the positions in the tetrahedra previously occupied by aluminum. A final calcination step at temperatures of from 400° to 1000° C. converts essentially all of the residual ammonium complex to the hydrogen form.

The concentration of acid present in the aqueous solution may vary between about 0.1 to about 20 molar, more preferably from 0.1 to 12 molar where the acid is a strong acid. The amount of acid should be in excess of the amount which would be theoretically required to exchange all of the original cations present in the aluminosilicate with protons, even though in many cases it is not possible to exchange 100% of these original cations. Expressed on the basis of moles of acid per mole of aluminum present in the zeolite, the preferred acid concentration ranges from about 0.5 to about 1.0 moles of acid per mole of aluminum.

Where the ion exchange material is a source of ammonium ions, the concentration of the ion exchange material in aqueous solution may be within the range of from about 0.5 to 2 molar and is preferably at least equivalent to the theoretical amount required to exchange all of the original cations present in the original aluminosilicate with ammonium ions, more preferably from about 3 to 10 times the amount so required.

The concentration of aluminosilicate contacted with the ion exchange solution may generally range from about 1 to about 25% by weight, more preferably from about 2 to 15% by weight.

In many instances, particularly involving ammonium exchange, a single ion exchange treatment is not sufficient to produce the desired degree of exchange and dealumination. The exchange process must therfore be repeated for a number of cycles, generally ranging from 2 to about 10 total cycles. This may be accomplished by separating the aluminosilicate from the aqueous medium after each treatment, washing it with water and then repeating the ion exchange process with fresh ion exchange solution.

Treatment times will vary as a function of the nature of the starting zeolite and the identity of the ion exchange material. In general, each treatment cycle is preferably carried out by heating the ion exchange material at reflux for a period of from about 1 to about 6 hours, more preferably from about 2 to about 4 hours.

A wide variety of acidic materials may be utilized in the dealuminization/ion exchange process of this invention. These include amine acids such as ethylenediaminetetracetic acid ($H_4EDTA$) as well as derivatives thereof such as diethylene triamine pentaacetic acid, nitrilotriacetic acid and the like.

Representative inorganic acids which can be employed include acids such as hydrochloric acid, hypochlorous acid, chloroplatinic acid, sulfuric acid, sulfurous acid, hydrosulfuric acid, peroxydisulfonic acid ($H_2S_2O_3$), peroxymonosulfuric acid ($H_2SO_5$), dithionic acid ($H_2S_2O_6$), sulfamic acid ($H_2NSO_3H$), amidodisulfonic acid ($NH(SO_3H)_2$) chlorosulfuric acid, thiocyanic acid, hyposulfurous acid ($H_2S_2O_4$) pyrosulfuric acid ($H_2S_2O_7$), thiosulfuric acid ($H_2S_2O_3$), nitrosulfonic acid ($HSO_3.NO$), hydroxylamine disulfonic acid (($HSO_3)_3NOH$), nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, ocnanthic acid, pelargonic acid, capric acid, undecyclic acid, lauric acid, myristic acid, palmitic acid, stearic acid, oxalic acid, malonic acid, succinic acid, glutaric acid, adipic acid, pimelic acid, suberic acid, azelaic acid, sebacic acid, alkylsuccinic acid, alkenylsuccinic acid, maleic acid, fumaric acid, itaconic acid, citraconic acid, mesaconic acid, plutonic acid, muconic acid, ethylidene malonic acid, isopropylidene malonic acid, allyl malonic acid and the like.

Representative aromatic and cycloaliphatic monocarboxylic, dicarboxylic and polycarboxylic acids include 1,2-cyclohexane-dicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxy-cinnamic acid, hydrocinnamic acid, pyrogallic acid, benzoic acid, ortho, meta and para-methyl, hydroxyl, chloro, bromo and nitro-substituted benzoic acids, phenylacetic acid, mandelic acid, benzylic acid, hippuric acid, benzenesulfonic acid, toluenesulfonic acid, methanesulfonic acid and the like.

Representative ammonium compounds which can be employed include ammonium chloride, ammonium bromide, ammonium iodide, ammonium carbonate, ammonium bicarbonate, ammonium sulfate, ammonium hydroxide, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium galate, ammonium nitrate, ammonium nitrite, ammonium formate, ammonium propionate, ammonium butyrate, ammonium valerate, ammonium lacate, ammonium malonate, ammonium oxalate, ammonium palmitate, ammonium tartarate and the like. Still other ammonium compounds which can be employed include tetraalkyl and tetraaryl ammonium salts such as tetramethylammonium hydroxide, and trimethylammonium hydroxide. Other compounds which can be employed are nitrogen bases such as the salts of guanidine, pyridine, quinoline, etc.

The precise process conditions and concentration of ion exchange material in solution required to produce the modified zeolites of this invention having ideal desiccation properties for gas fired cooling systems will vary depending upon the identity of the starting zeolite material and its chemical and physical structure. As illustrated in the following examples, a certain amount of trial and error experimentation within the parameters set forth above may be required to achieve a modified material having the ideal isotherm separation factor of from 0.07 to 0.1 and a relatively low heat of adsorption within the range of from about 11 to about 13 Kcal/mole.

In the following examples, the polarity on the zeolite surfaces was reduced by dealuminization of the structure by HCl and $H_4EDTA$ exchange, and by $NH_4^+$ exchange followed by steam treatment. Since the stability of zeolites towards acid depends on the Si/Al ratio in the structure, the concentrations and the type of treatments (whether $H_4EDTA$ or HCl) to be employed depends on the type of zeolite. The preferred concentration of acid may be varied from 0.1 to 12 M and may be present at a level of from about 0.5 to about 1.0 moles per mole of aluminum in the zeolite. The ideal shape of the water isotherms was achieved both without calcination and with samples calcined at 600° C., and for crystalline samples, the x-ray crystallinity was also preserved up to 1000° C. (1832° C.) The adsorption capacities of these materials covers a range from 10 to 40% on the weight basis of the sample, and in some cases, the capacities were greater than those of the original samples. The amorphous sample was similar to silica gel as seen in x-ray diffractograms, but the micropore structure of the parent zeolite was preserved. This invention thus provides for x-ray amorphous, crystalline and composites of both amorphous and crystalline materials which give moderate type I isotherms for water adsorption.

Figure 5:
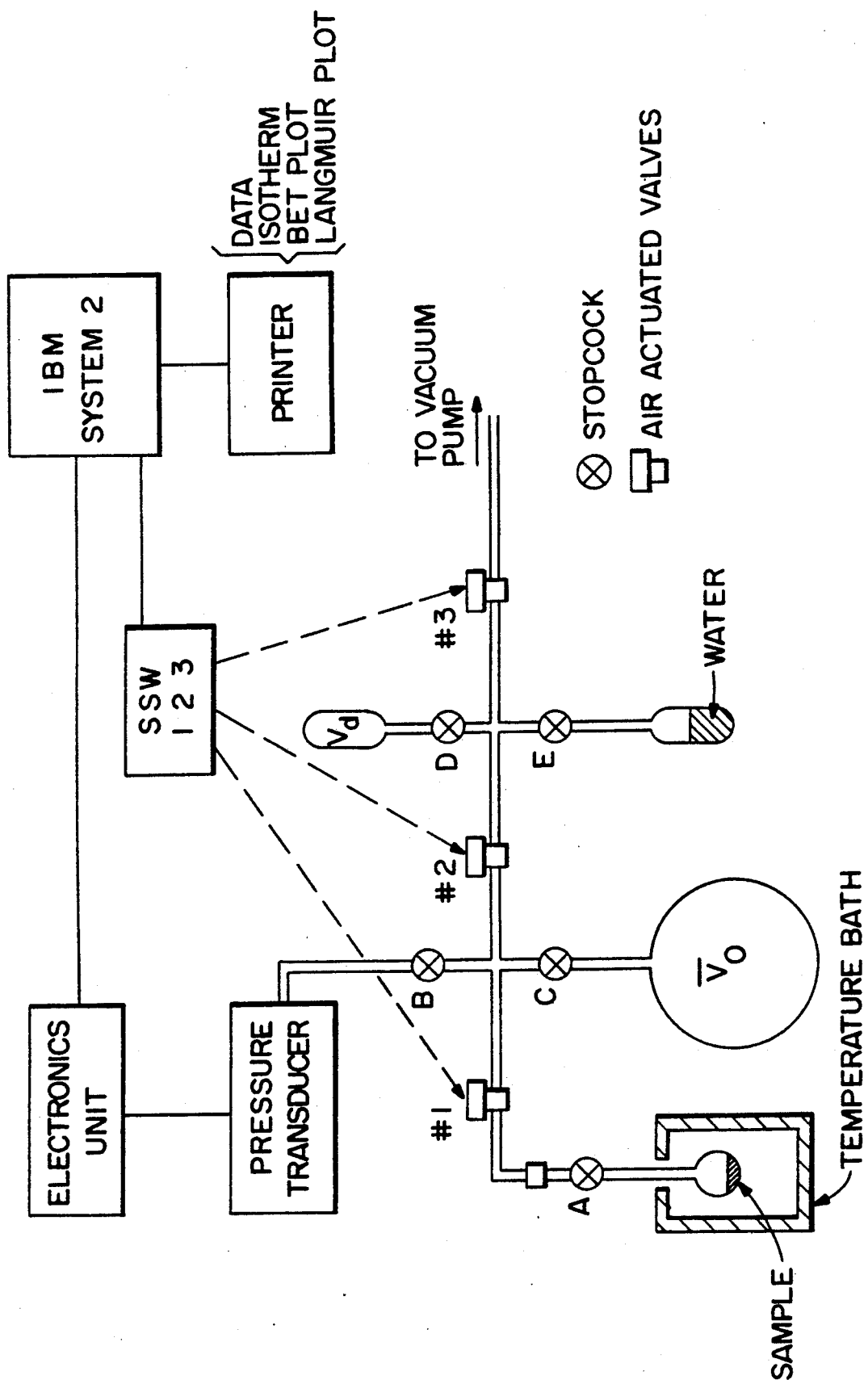
FIG. 5 is a schematic illustration of a computer-interfaced sorption measurement apparatus.

Water sorption isotherms were measured by a volumetric method at 20° or 25° C. using a computer interfaced sorption apparatus, such as a schematically illustrated in FIG. 5. The molar quantity of water vapor sorption ( n) by the sample can be calculated on the basis of the ideal gas equation:

$$\Delta p \cdot V_o = \Delta n\, RT$$

wherein $\Delta p$ is the pressure difference in the system, $V_o$ is the total volume of the system excluding the sample volume, R is the gas constant, and T is the absolute temperature of the vapor. About 50–70 mg of precalcined sample is degassed at 200° C. for 5–10 hr prior to the sorption measurements. The constant volume in which the sample was exposed to water vapor was about 350 ml. The pressure was recorded by a high-accuracy pressure transducer (MKS Instrument, Inc., Model 390H). The equilibrium conditions were defined by the pressure diffrence of 0.05 Torr during 240 seconds, that is, if the pressure difference during 240 seconds <0.05 Torr, equilibrium was assumed. This setting for equilibrium corresponds to the increase in the sorption amount of <20 micrograms in 240 seconds. For desorption measurements, the equilibrium conditions are defined by the pressure difference of 0.05 Torr in 360 seconds. The apparatus is precise and sensitive, inasmuch as the pressure transducer can detect a pressure difference of +3 micrograms of water.

Sorption was measured at 20°, 30°, and 40° C. for the estimation of the heat of adsorption. The isosteric heat of adsorption ($q_{st}$) is calculated according to the following equation:

$$(\ln P)_n = q_{st}/RT + \text{constant},$$

where P, n, $q_{st}$ and T are the equilibrium pressure, amount of adsorption, isosteric heats of adsorption and absolute temperature (K), respectively. The plots of lnP vs. 1/T at different amounts of sorption (n) showed linear relationships, and the value $q_{st}$ is calculated from the slope of the plot.

The following examples are illustrative of the invention.

EXAMPLE 1

Figure 6:
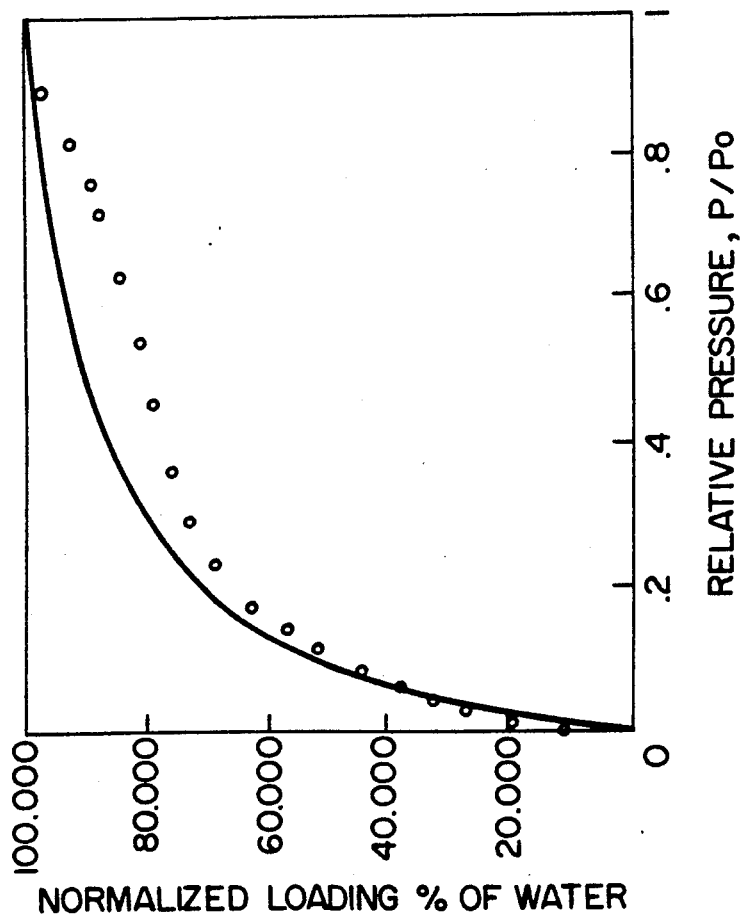
FIGS. 6, 8, 9, 10, 11, 12, 13, 14, 15, 16, 19, 20, 21, 22 and 23 are plots of water adsorption and desorption isotherms of various materials described herein.

Two grams of zeolite 13Y ($SiO_2/Al_2O_3 = 4.8$) were heated at 90°–100° C. (194°–212° F.) with 40 ml of 0.25 and 0.5 M HCl respectively for 4 hr. After 4 hr., the samples were washed 5 times by centrifugation with 35 ml of deionized water. After the last wash, the samples were dried overnight at 60° C. (140° F.). Samples were calcined at 200°–500° C. (392°–932° F.) for 20 hr. and degassed at 200° C. (392° F.) for 4–10 hr prior to water adsorption measurements at 20° (68° F.) or 25° C. (77° F.) The adsorption capacities were found to be 27 and 18–20% for 0.25 and 0.5 M HCl treated samples respectively as compared to 32% water absorption capacity of the original sample. The water adsorption isotherms of the 0.5 M HCl treated sample which was degassed at 300° C. (572° F.) along with the ideal curve are given in FIG. 6. X-ray data indicated that the sample treated with 0.25 M HCl was a composite of both the crystalline and amorphous phase, whereas the sample treated with 0.5 M HCl was completely amorphous and was similar to silica gel. Scanning electron micrographs showed that the amorphous product preserved the crystal morphology of the original sample.

EXAMPLE 2

Six grams of hydrated NaY ($SiO_2/Al2O_3 = 5.3$) were slurried in 135 ml of deionized water. To the zeolite-water slurries, various amounts of $H_4EDTA$ corresponding to $H_4EDTA$/Al molar ratio of X=0.5, 0.6, 0.75, 0.9, and 1.0 were separately added and refluxed for 2 hr (Method A). In another set of experiments, the zeolite-water-$H_4EDTA$ slurry was centrifuged and decanted after refluxing for the first 2 hr. To this solid 135 ml of water was added and the mixture was refluxed for an additional 2 hr. (Method B). After refluxing, the solids were washed 4 times with deionized water using a centrifuge. The supernantant solutions were collected for the determination of Na, Al, and Si. Solids were dried at 60° C. overnight.

Figure 7:
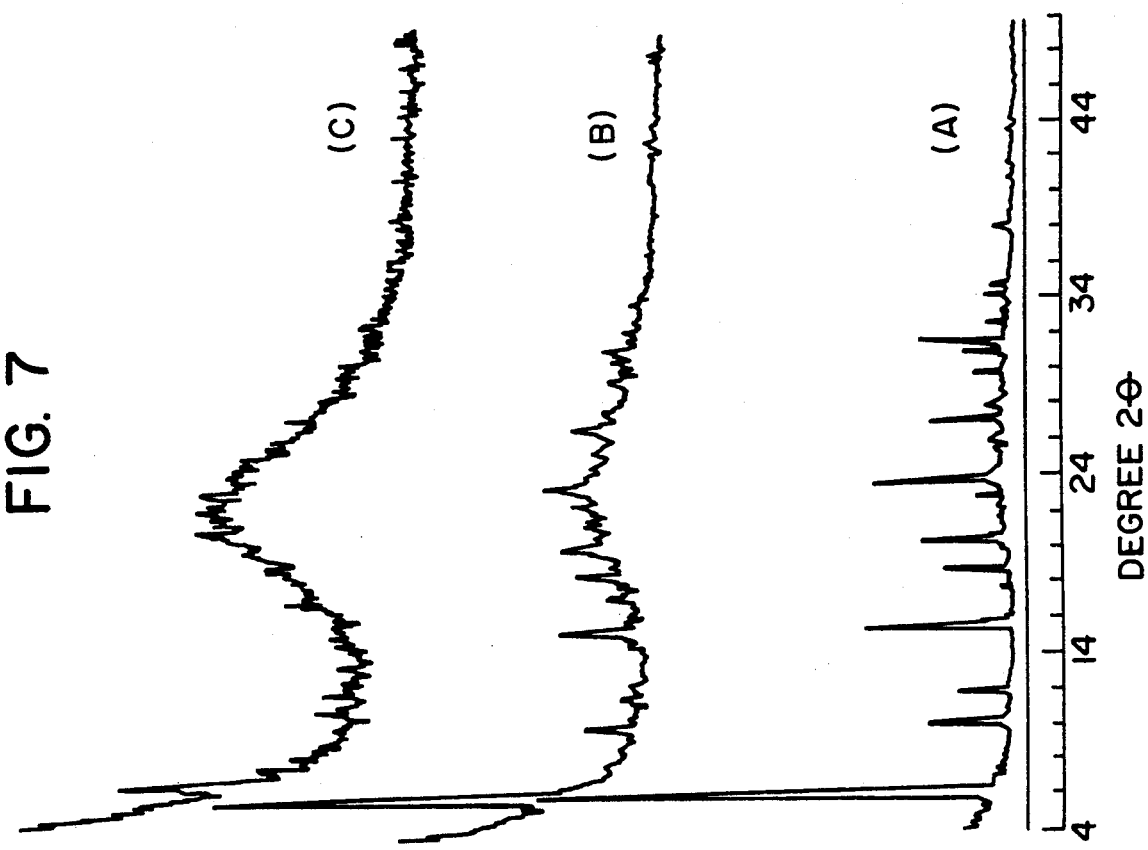
FIGS. 7 and 18 are plots of X-ray diffraction patterns of various materials described herein.

XRD patterns of products prepared by Method B using X=0.5, 0.75, and 0.9 are given in FIG. 7. Samples prepared by Method A also gave exactly the same XRD patterns for X=0.5 and 0.9 as shown in FIG. 7, and gave slightly more crystalline products for X=0.75 compared to the sample prepared using Method B. The sample prepared using X=0.5 yielded a crystalline product whereas the sample using X=0.9 yielded a completely amorphous product. Calcination of samples X=0.5 at 400° C. (752° F.) prepared by either Method did not change their X-ray crystallinity.

The amounts of Al, Na and Si (mmoles/100g of zeolite) released as a result of the $H_4EDTA$ treatments are shown in Table 2.

TABLE 2

| X* | METHOD A | | | METHOD B | | |
| --- | --- | --- | --- | --- | --- | --- |
| | Al | Na | Si | Al | Na | Si |
| 0.5 | 92 | 150 | 24 | 196 | 202 | 47 |
| 0.6 | ND** | ND | ND | 248 | 249 | 54 |
| 0.75 | 288 | 300 | 22 | 304 | 310 | 45 |
| 0.9 | 352 | 357 | 20 | 360 | 347 | 39 |

TABLE 2-continued

| X* | METHOD A | | | METHOD B | | |
|---|---|---|---|---|---|---|
| | Al | Na | Si | Al | Na | Si |
| 1.0 | 376 | 366 | 19 | 376 | 394 | 45 |

X* = $H_4EDTA/Al$ molar ratio
**ND — not determined

As may be seen from Table 2, the amount of Al and Na extraction increased with increasing X. Some Si was also released which remained constant with increasing X. These elements were extracted more from samples prepared by Method B than in the case of Method A. The largest difference was found for X=0.5. The extraction of Na and Al by Method B for X=1.0 corresponds to 91 and 89% respectively of the total amount of these ions originally present in the zeolite.

Figure 8:
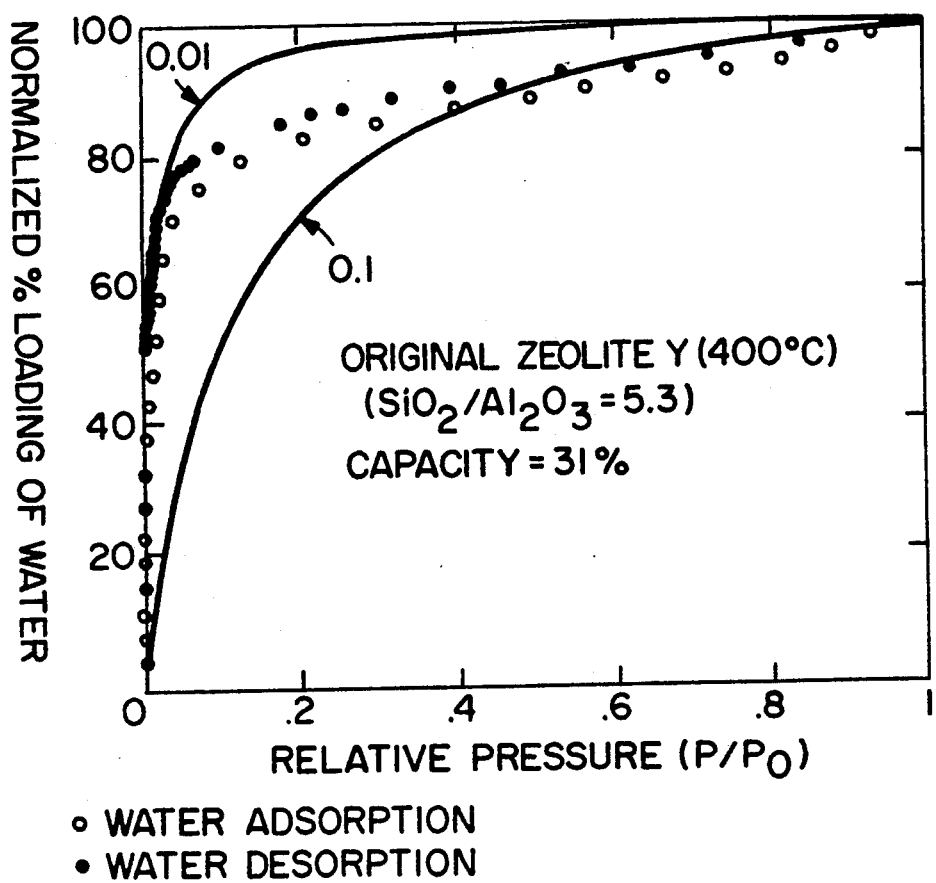
Figure 11:
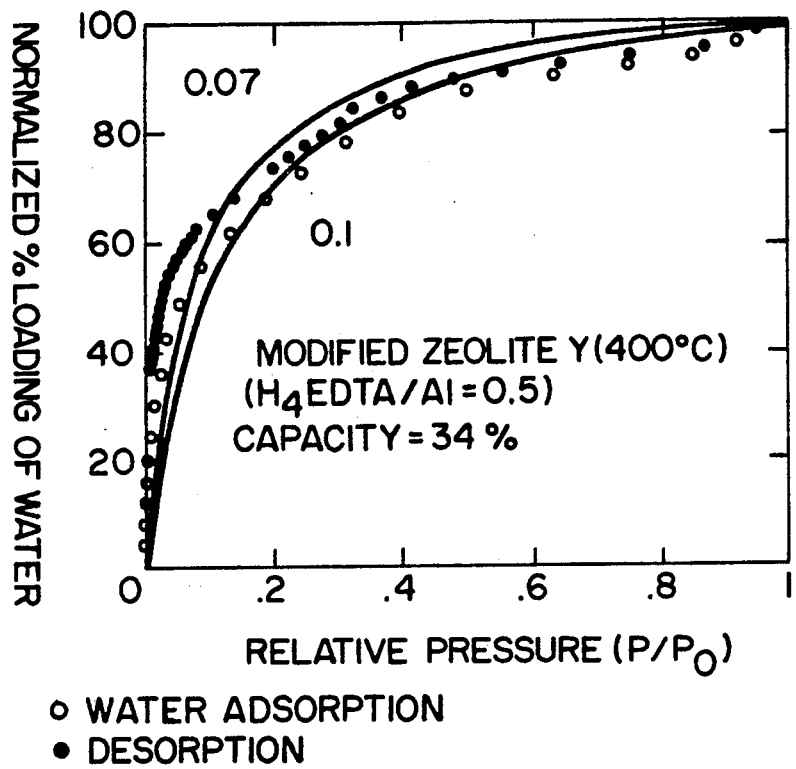
Figure 12:
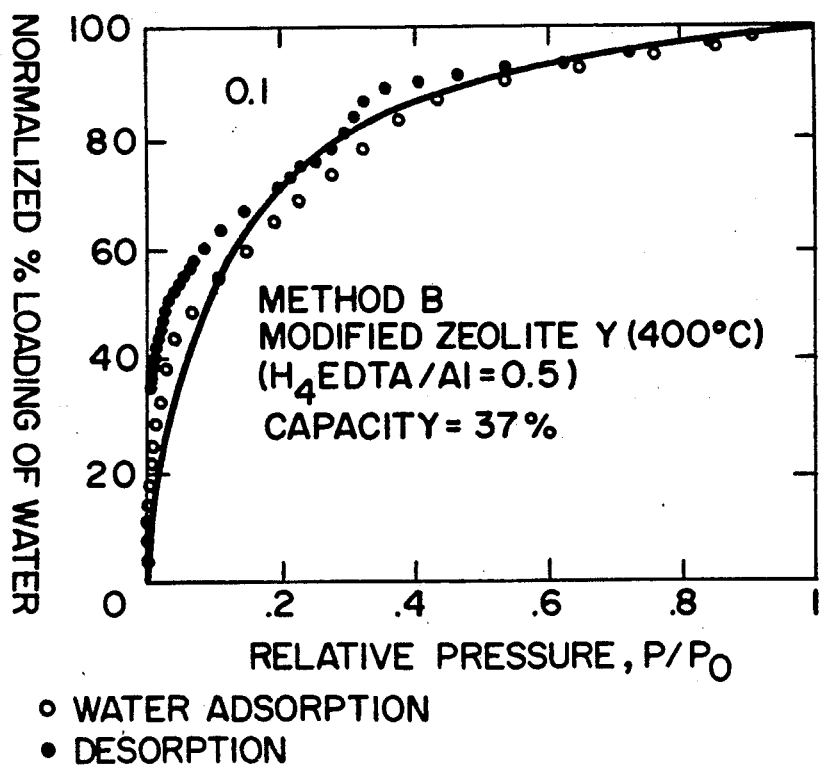
Figure 13:
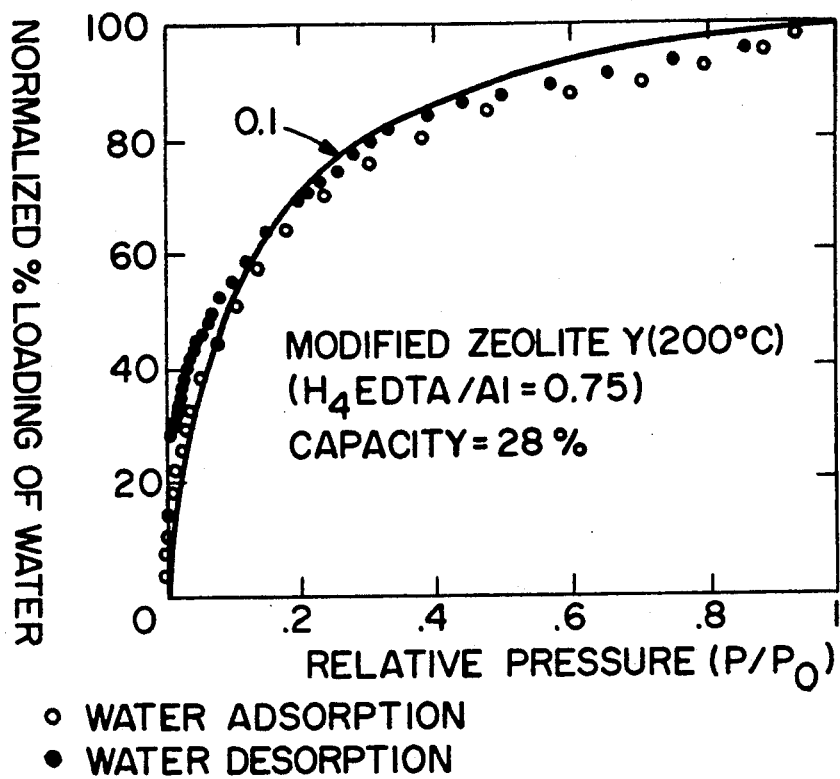
Figure 14:
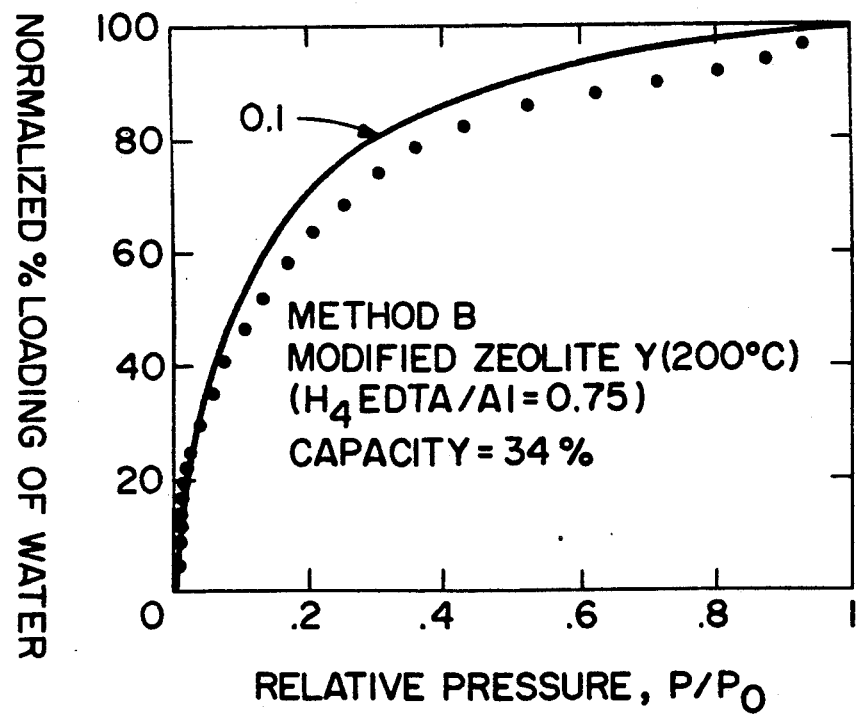
Figure 15:
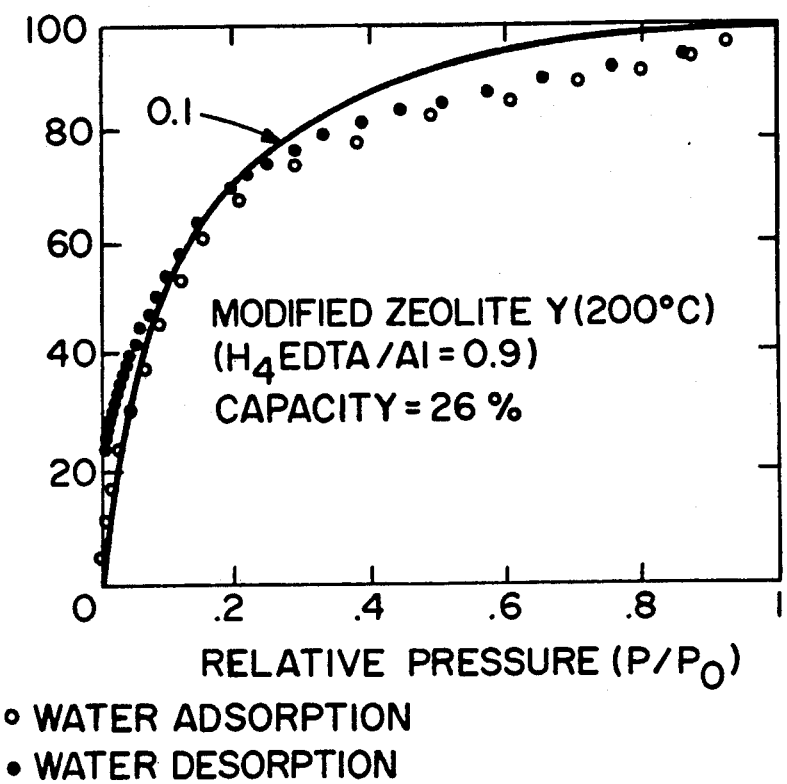
Figure 16:
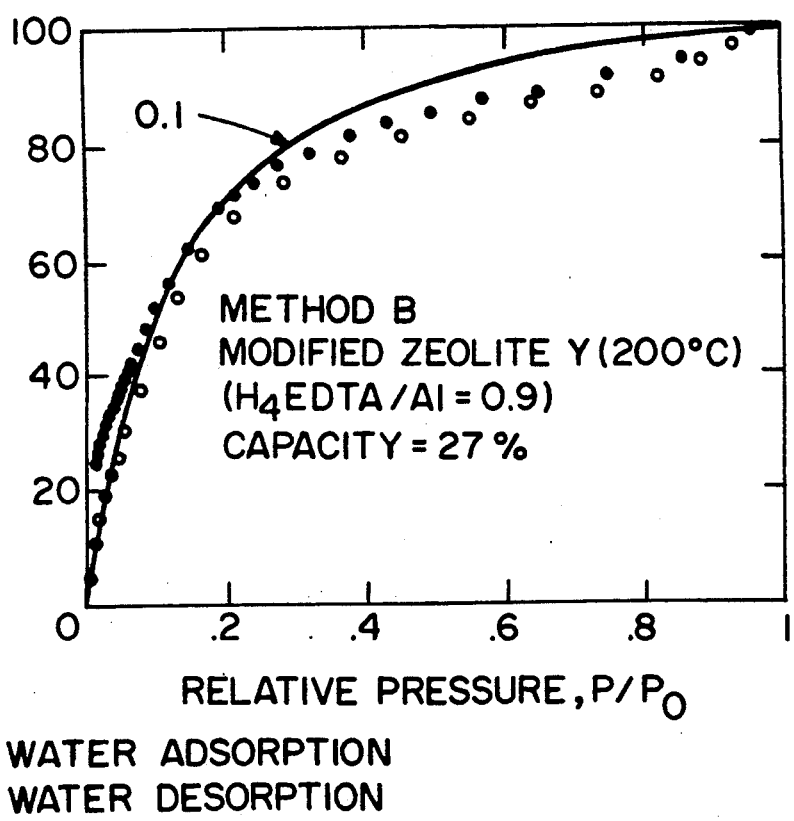

Water sorption isotherm of the original Na-Y zeolite starting material is given in FIG. 8. As expected, this sample exhibited an extreme Type I isotherm. Isotherms of samples treated with X=0.5 are given in FIGS. 9-12. These samples yielded isotherms with separation factors in the range of 0.07-0.1. Samples prepared by Method B had larger sorption capacity compared to samples prepared by Method A. It is, however, evident that the sample prepared by Method B was more sensitive to thermal treatment than the sample prepared by Method A (FIGS. 11 and 12).

Water Isotherms of the sample X=0.75 and X=0.9 are given in FIGS. 13, 14, 15, and 16 respectively. As in the case of X=0.5, samples prepared by Method B gave higher sorption capacity. For X=0.75, the sample prepared by Method A gave slightly better shape than sample prepared by Method B.

Scanning electron micrographs of the original Na-Y sample before and after treatment with $H_4EDTA$ (X=0.9) by Method B and by Method A shows that the surface morphology of these two samples are very similar, indicating that the crystal-like morphology is maintained in the treated sample, even though the latter sample is amorphous to X-ray.

Figure 17:
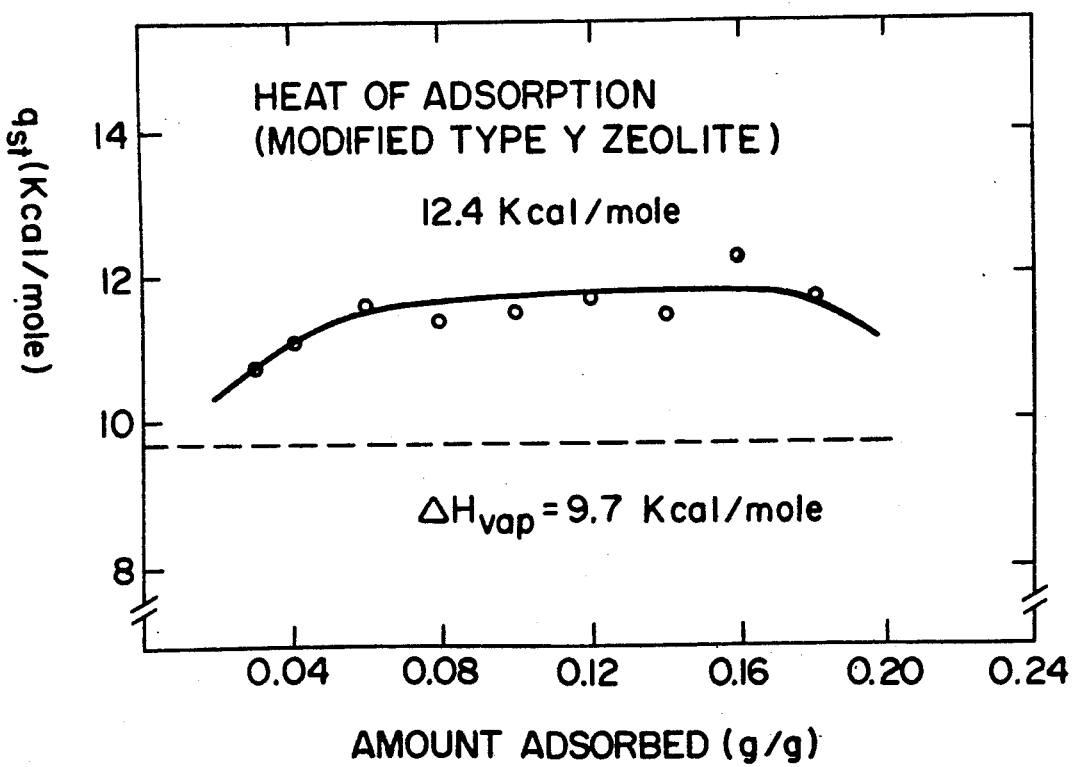
FIG. 17 is a plot of isosteric heat of adsorption of a modified type Y zeolite.
Figure 9:
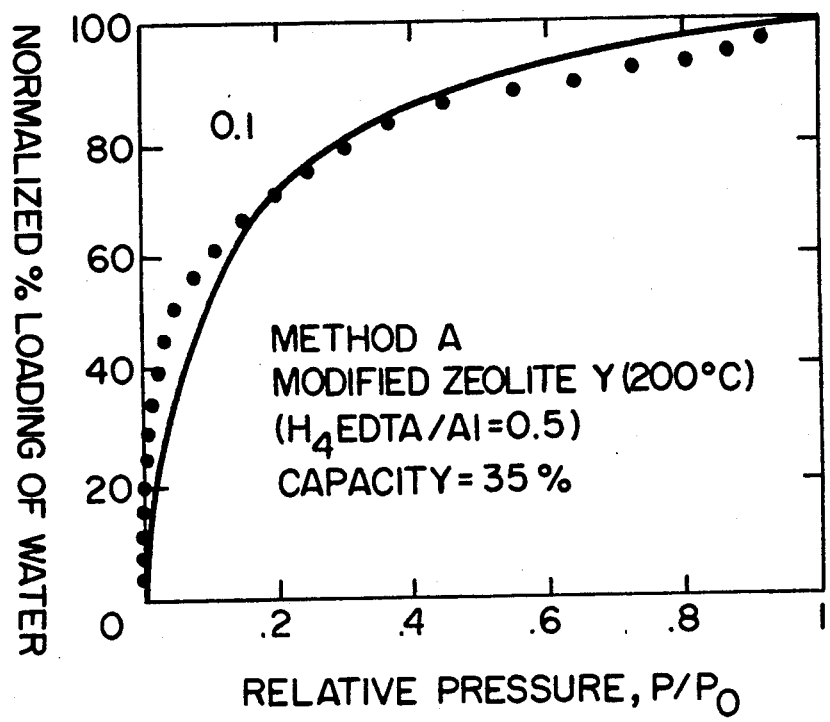
Figure 10:
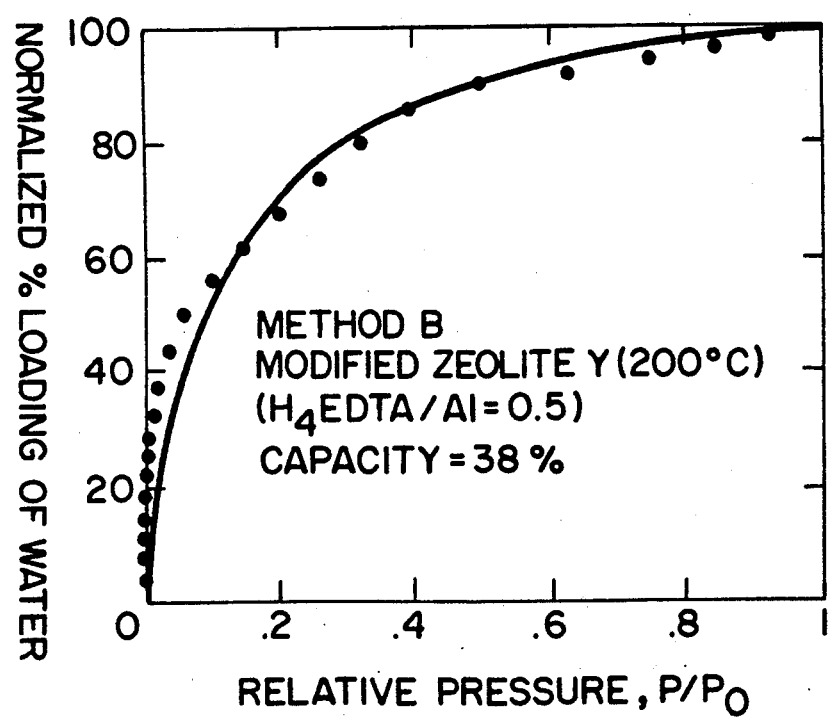

Isosteric heat of the sample, X=0.9 prepared by Method A is given in FIG. 17. This sample gave a low heat of adsorption which is close to latent heat of vaporization. (9.7 Kcal/mole) and heat of liquefication (10.6 Kcal/mole). Estimation of heat of adsorption from BET 'c' constant for other samples also gave a reasonably low heat of absorption. For example, samples with X=0.5, 0.75 and 0.9 prepared by Method A gave the net heat of adsorption of 2.7, 2.1, and 1.9 Kcal/mole, respectively. These values are close to the heat of liquefaction.

EXAMPLE 3

About eight grams of Na-Y zeolite ($SiO_2/Al_2O_3$=5.3) was slurried in 1 N $NH_4Cl$ solution equivalent to five times the cation exchange capacity (total Na content) of the zeolite. The slurry was divided and portions were refluxed from one to four times. Each reflux treatment was performed for a period of two hours followed by separating the solids by centrifugation. A fresh solution of $NH_4Cl$ was added after each reflux treatment. The excess salts were removed by washing with deionized water and centrifugation at the end of each batch experiment. The $NH_4^+$ exchanged samples were placed separately in a tubular furnace and heated at 600° C. for 4 hr. in a steam environment. To exchange a very high amount of $NH_4^+$ ions, the sample refluxed four times was steamed at 650° C. for 4 hr. followed by refluxing in $NH_4Cl$ solution for 24 hr. and steaming again at 600° C. for 4 hr. After steaming, all samples were further calcined at 650° C. for 4 hr. in air.

Figure 18:
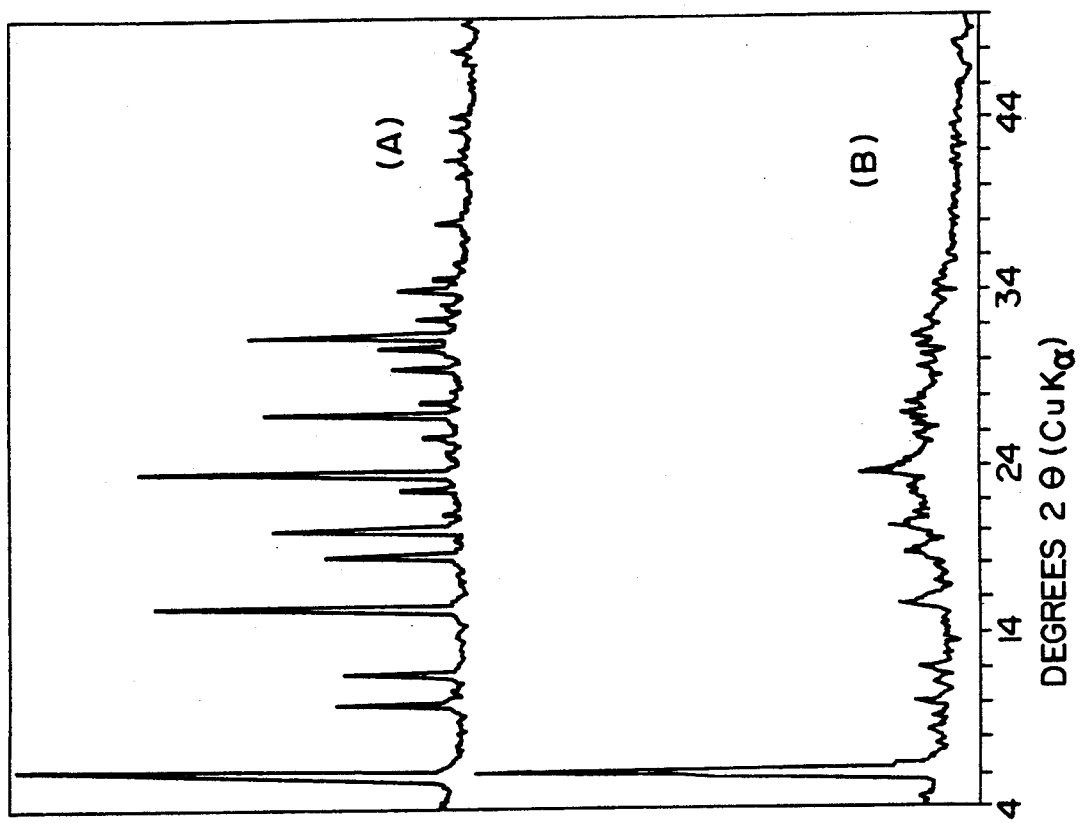

X-ray powder diffraction (XRD) analysis indicated that the crystallinity of all of the $NH_4^+$ exchanged samples calcined at 600° C. in the presence of steam was preserved, whereas samples calcined in air progressively lost their crystallinity as the number of reflux treatments increased. XRD patterns of a sample prepared by refluxing twice with $NH_4Cl$ solution and calcined in air or steam are compared in FIG. 18.

Figure 19:
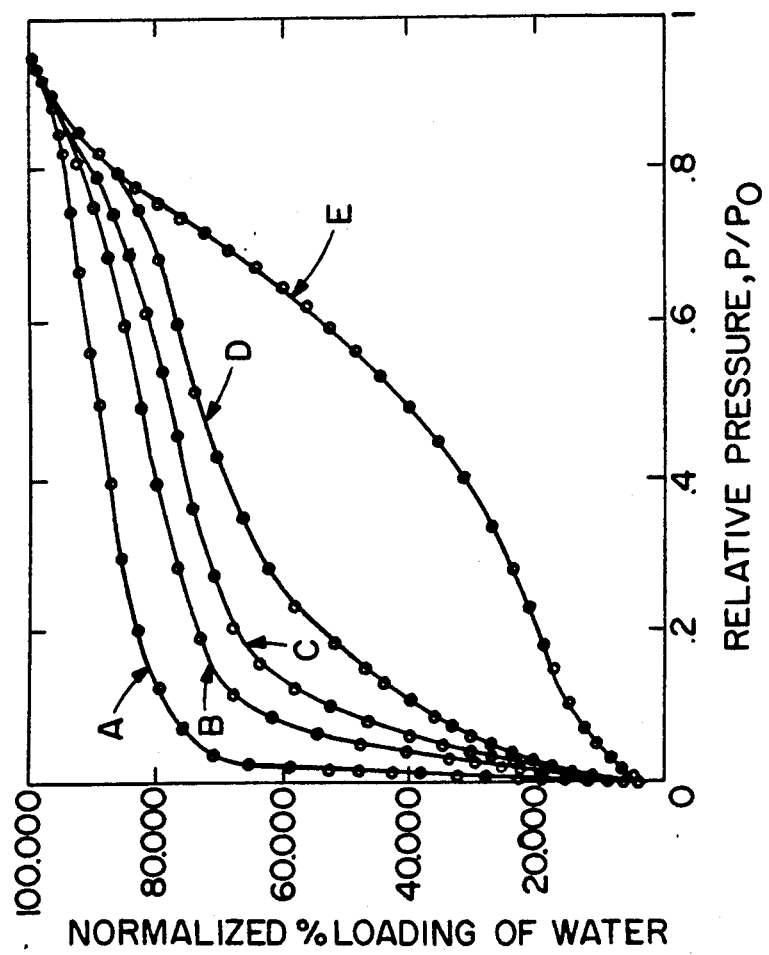

Water adsorption isotherms of the original Na-Y and modified samples are compared in FIG. 19. The extreme Type I water isotherm of the original sample has progressively been converted to Type IV by way of moderate Type I isotherms. The achievement of a family of curves from an extremely hydrophilic material without destroying its crystallinity is a well known example of the reduction of hydrophilicity (polarity) in the original material as a result of decationation (removal of Na+) and dealumination (removal of Al from the framework). This process, however, produced some defects and secondary pores which are apparent from increased adsorption ("hump") at relative pressure $\geq 0.75$. These secondary pores were filled near saturation vapor pressure.

Figure 20:
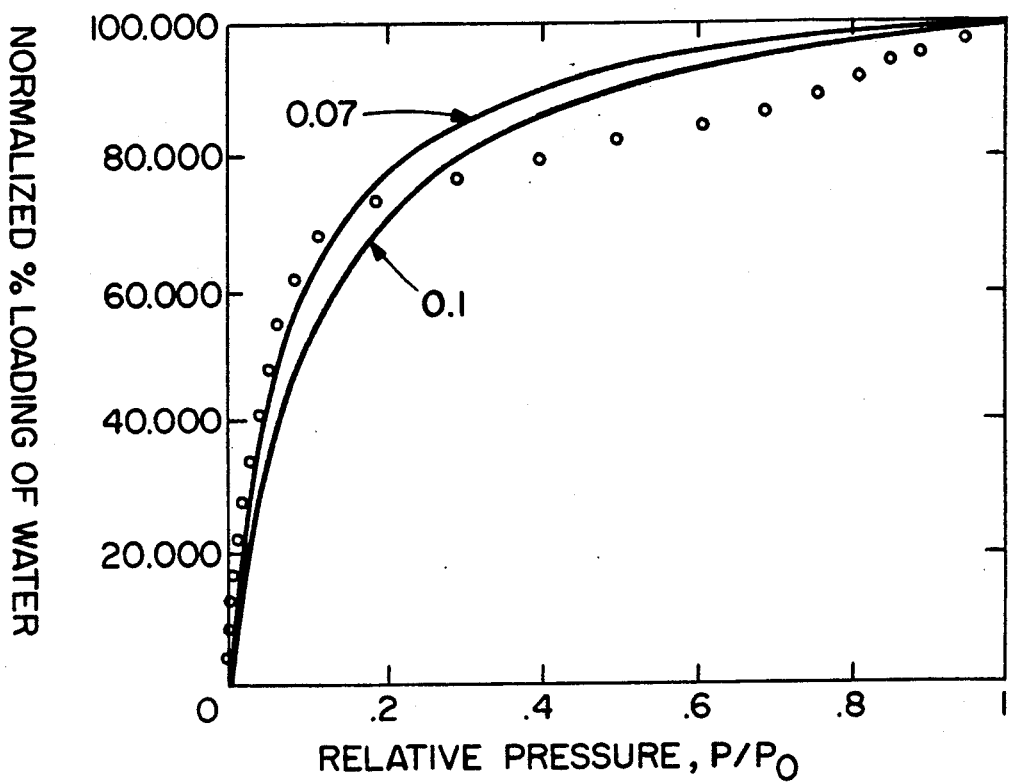
Figure 21:
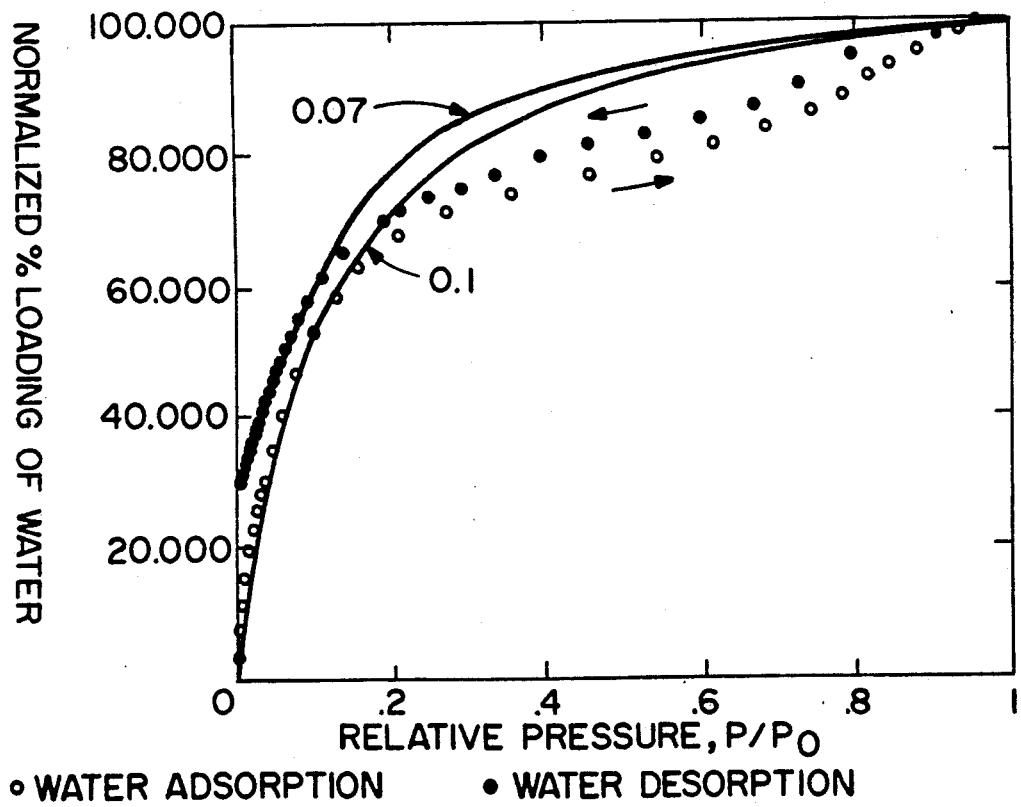

Water isotherms of samples prepared by refluxing once and twice with $NH_4Cl$ solution are compared with ideal isotherms in FIGS. 20 and 21. These crystalline samples yielded close to ideal isotherms at a relative pressure up to about 0.2 with high sorption capacities (33% by weight) and high thermal stability.

EXAMPLE 4

Figure 22:
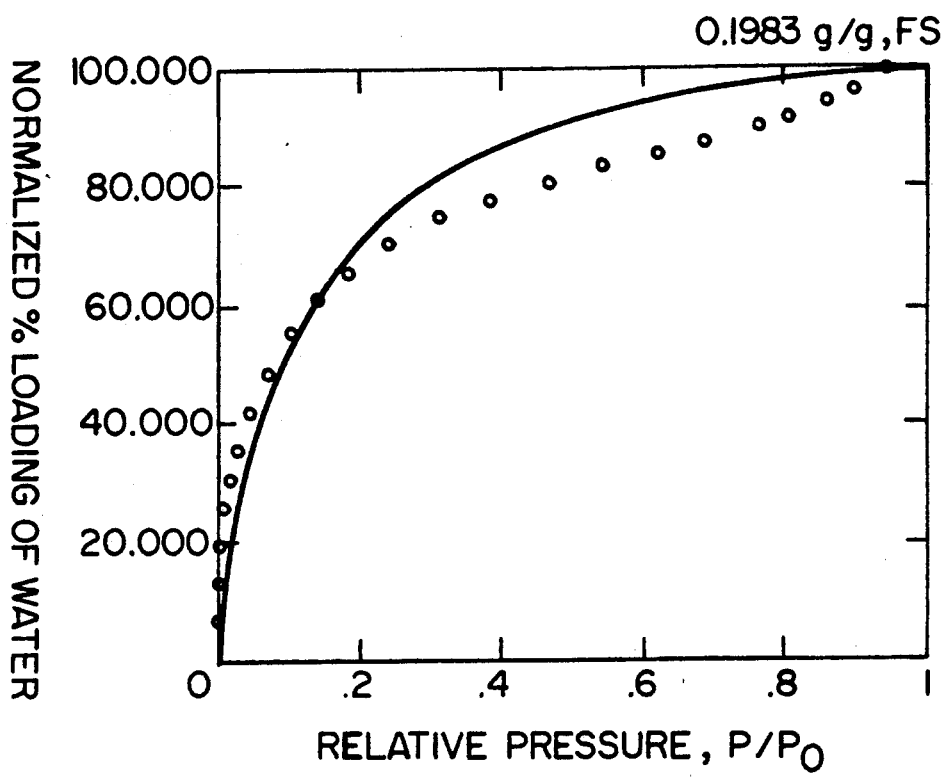

Four grams of zeolites 100 zeolon Na ($SiO_2/Al_2O_3$=11.2) and 100zeolonH ($SiO_2/Al_2O_3$=11.2) were boiled with 40 ml of 2 M, 4 M, 6 M and 12 M hydrochloric acid (HCl) respectively for 4 hr. After 4 hr, the slurries were centrifuged, decanted and washed 5 times with 40 ml deionized water. Washed samples were dried at 60° C. (140° F.) overnight and calcined at 200°-1000° C. (392°-1832° F.) for 4-20 hr. Most of the samples remained crystalline but part of it was rendered amorphous. The isotherm of the sample treated with 12 HCl and degassed at 200° C. 392° F.) for at least 4 hr is given in FIG. 22 and shows ideal shape. About 17% increase in total absorption capacity as compared to the original sample was observed. This is attributed to the increase in adsorption volume due to exchange of smaller H+ ion for larger Na+ ions as well as voids created as a result of dealumination after the acid treatment.

EXAMPLE 5

Figure 23:
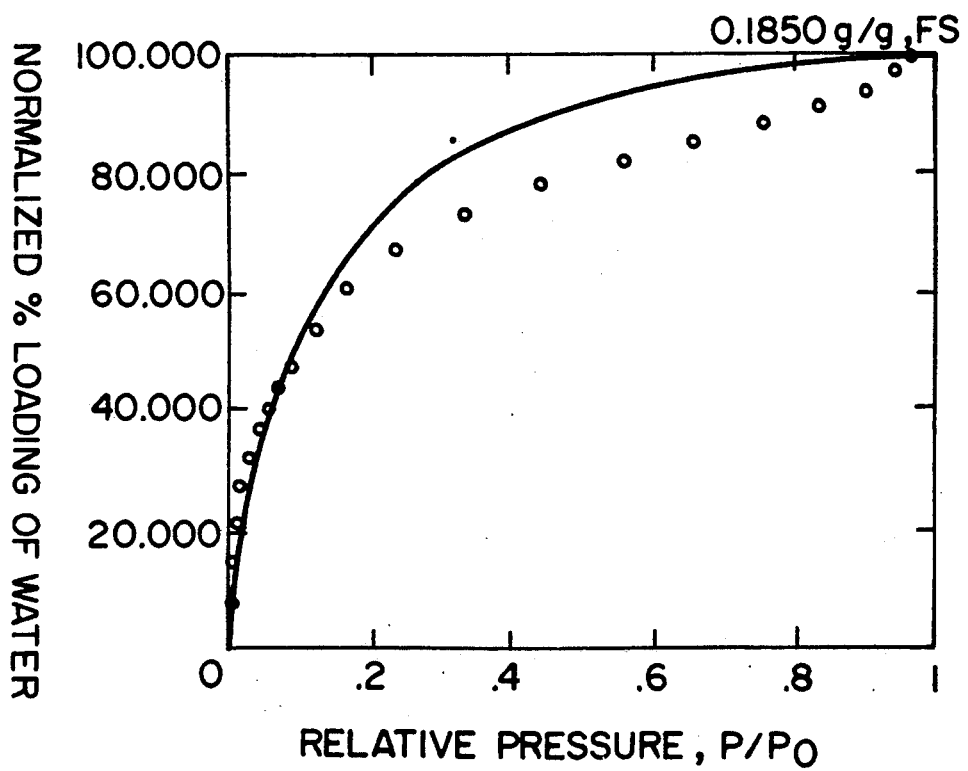

Four grams of erionite ($SiO_2/Al_2O_3$=7.9) from Shoshone, California was treated with 80 ml of 0.5 and 0.75 M HCl respectively for 4 hr. After 4 hr, the samples were washed 5 times with deionized water by centrifugation and dried at 60° C. (140° F.). Samples dried at 60° C. were calcined at 200°-400° C. before the adsorption measurement. Water adsorption isotherm of the sample treated with 0.5 M HCl and calcined at 400° C. (752° F.) is given in FIG. 23 and shows ideal shape. Again the total absorption capacity was found to increase by 25% as compared to the original sample. XRD analysis showed that this sample remained largely crystalline.

Accordingly, microporous materials have been developed which exhibit ideal water adsorption isotherms for use as desiccants in cooling and dehumidification equipment. These materials have large sorption capacity, low heat of asorption, high rate of absorption and high thermal and chemical stability.

What is claimed is:

1. In a desiccant cooling system process wherein a moving stream of air is progressively and sequentially adiabatically dehumidified by passing it through a desiccant material to produce warm dry air, cooled to produce cool dry air, and adiabatically humidified to produce cool nearly saturated air for introduction into the space to be cooled, the improvement which comprises utilizing as a desiccant material particles of a modified aluminosilicate having an isotherm separation factor within the range of from about 0.07 to about 0.1

2. The process of claim 1 wherein said aluminosilicate is modified by subjecting an aluminosilicate having a silica to alumina ratio of at least about 3 and an average pore diameter size within the range of from about 4 to about 10 angstroms to treatment with an aqueous solution of an acid or a source of ammonium ions to exchange at least a portion of any metal ions present in the aluminosilicate with protons and to remove at least a portion of the aluminum present in the aluminosilicate.

3. The process of claim 2 wherein said acid is an organic or inorganic acid.

4. The process of claim 3 wherein said acid is ethylenediaminetetracetic acid.

5. The process of claim 4 wherein said ethylenediaminetetracetic acid is present in said aqueous solution at a level corresponding to a molar ratio of acid to aluminum within the range of from about 0.5 to about 1.0.

6. The process of claim 3 wherein said acid is present in said aqueous solution at a molar concentration within the range of from about 0.1 to about 20 N.

7. The process of claim 6 wherein said acid is hydrochloric acid.

8. The process of claim 2 wherein said aqueous solution contains a source of ammonium ions and wherein said protonic ion exchange is carried out by thermal decomposition of the ammonium exchanged aluminosilicate.

9. The process of claim 8 wherein said ammonium ion source is present in said aqueous solution at a molar concentration within the range of from about 0.5 to about 2.0 N.

10. The process of claim 9 wherein said source of ammonium ions is ammonium chloride.

11. The process of claim 1 wherein said modified aluminosilicate has a water adsorption capacity within the range of from about 10 to about 40% weight, based on the dry weight of aluminosilicate.

12. The process of claim 1 wherein said modified aluminosilicate has a heat of adsorption value within the range of from about 11 to about 13 kcal/mole.

13. The process of claim 2 wherein said aluminosilicate has a silica to alumina ratio of from about 4 to about 20.

* * * * *